No. 660,206. Patented Oct. 23, 1900.
S. C. BALL.
SPRING FASTENER FOR BOLTS.
(Application filed Nov. 7, 1898.)
(No Model.)
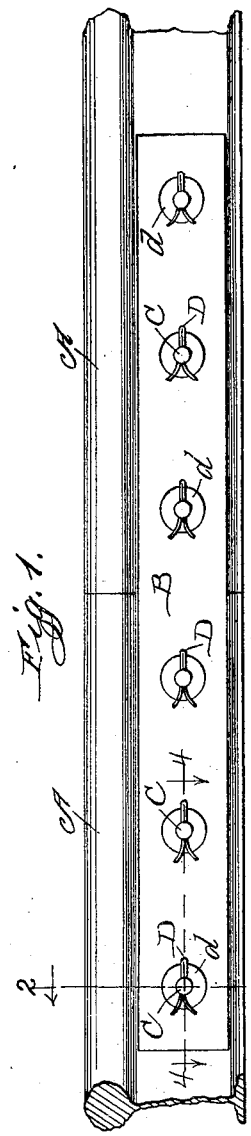
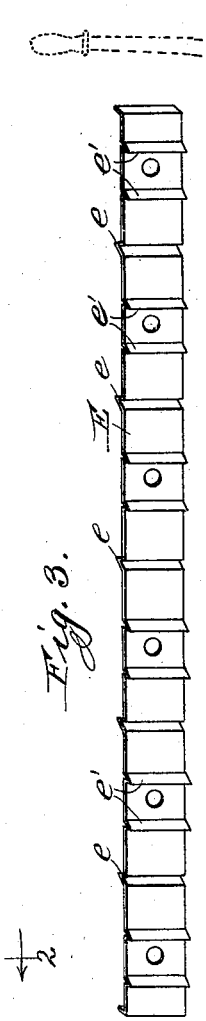
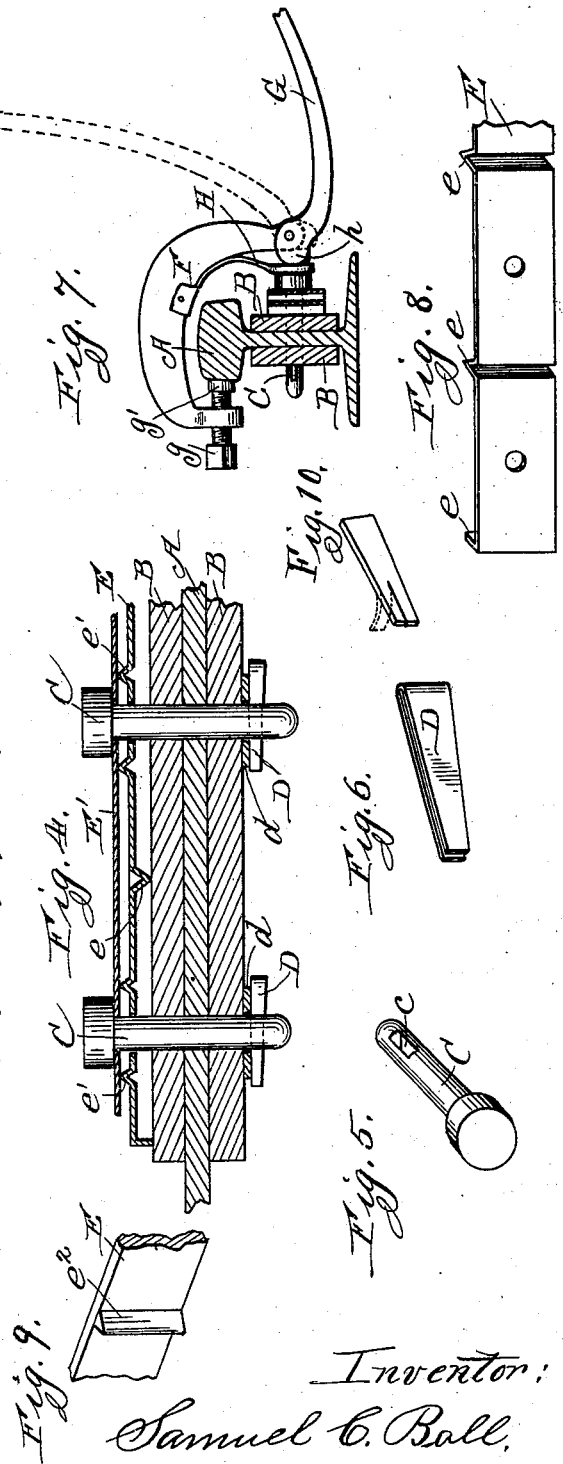
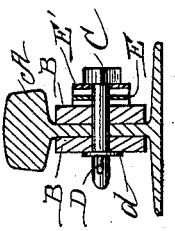
Witnesses:
V. J. Jacker.
E. A. Duggan.
Inventor:
Samuel C. Ball,
By Chas. C. Tillman, Atty.
THE NORRIS PETERS CO., PHOTO-LITHO., WASHINGTON, D. C.

UNITED STATES PATENT OFFICE.

SAMUEL C. BALL, OF CHICAGO, ILLINOIS.

SPRING-FASTENER FOR BOLTS.

SPECIFICATION forming part of Letters Patent No. 660,206, dated October 23, 1900.

Application filed November 7, 1898. Serial No. 695,700. (No model.)

*To all whom it may concern:*

Be it known that I, SAMUEL C. BALL, a citizen of the United States, residing at Chicago, (West Pullman,) in the county of Cook and State of Illinois, have invented certain new and useful Improvements in Spring-Fasteners for Bolts, of which the following is a specification.

This invention relates to improvements in a device to be used for fastening bolts employed for securing two or more pieces together, and while it is more especially designed for fastening the bolts used for securing fish-plates to railway-rails, yet it may be employed for fastening bolts used for various other purposes; and it consists in certain peculiarities of the construction, novel arrangement, and operation of the various parts thereof, as will be hereinafter more fully set forth and specifically claimed.

Heretofore it has generally been the custom to fasten the bolts by means of nuts engaging the screw-threaded ends. In using bolts and nuts the threads on the bolts are frequently stripped by being forced through the openings in the fish-plates and rails when the same are out of alinement or are spoiled by carelessly screwing up the nut when the threads thereof do not engage with the threads on the bolt, thus rendering the bolts useless. When nuts are used, it is necessary to employ a lock of some description to prevent them becoming loose or working off, and, besides, the expansion and contraction incident to the bolts and the pieces of metal which they secure together often cause the nuts to become loose.

It is therefore one object of my invention to provide a spring-fastener for bolts by means of which the use of nuts is dispensed with and the expansion and contraction are compensated.

Another object of my invention is to so construct the spring as to reduce to a minimum or prevent crystallization thereof due to the vibration caused by heavy trains passing over the rails.

In order to enable others skilled in the art to which my invention pertains to make and use the same, I will now proceed to describe it, referring to the accompanying drawings, in which—

Figure 1 is a view in side elevation of a joint with my improvement thereon. Fig. 2 is a cross-sectional view taken on line 2 2 of Fig. 1. Fig. 3 is a perspective view of the spring-plate, showing it detached. Fig. 4 is a longitudinal sectional view taken on line 4 4 of Fig. 1. Fig. 5 is a perspective view of one of the bolts. Fig. 6 is a similar view of a securing-key. Fig. 7 is a cross-sectional view taken on line 2 2 of Fig. 1, showing in elevation a tool used for inserting the bolts. Figs. 8 and 9 are perspective views of parts of the spring-plate, showing modifications in its construction; and Fig. 10 is a view of a modified form of the securing-key.

Similar letters refer to like parts throughout the different views of the drawings.

A represents the rails, and B the fish-plates, which are secured on each side thereof. The rails and fish-plates are provided with openings for the reception of bolts C, each of which is provided at one of its ends with a head and near its other end with a slot $c$ for the reception of the key D, which is bent back upon itself and is slightly tapered, as shown in Fig. 6 of the drawings. Located on the outer surface of one of the fish-plates B and extending across the joint of the rails is a spring-plate E, which is provided with a number of projections $e$ on its surface adjacent to the fish-plate and with projections $e'$ on its outer surface, against which the plate or bar E', which constitutes a part of the spring, may rest. These projections may be formed in the spring-plate E by making indentations crosswise thereof, as shown in Figs. 3, 4, and 8 of the drawings, or they may be formed by welding or otherwise securing a piece $e^2$ thereon, as shown in Fig. 9 of the drawings, which represents a modification in the construction of the spring-plate, in which modification the projections may be employed on both sides thereof or on one side only.

In Fig. 8 of the drawings I have shown another modification in which the projections $e$ are located on one side of the plate only and are made integral therewith by bending the plate transversely.

In Fig. 7 I have illustrated a tool which I prefer to use in placing my fastener in position, and it consists of a curved piece F, having in one of its ends a screw $g$, which carries on its end a cap $g'$ to rest against the rail A. The other end of the piece F is pivotally secured between the prongs of the forked lever or handle G, which prongs $h$ are eccentric to the fulcrum-point and rest against the spring H, which is secured at one of its ends to the piece F and has its other end enlarged to rest against the head of the bolt.

The manner of applying my fastener and its operation are as follows: The spring-plate E and plate or bar E', having openings for the reception of the bolts, are placed on one of the fish-plates, when the bolts C may be inserted so that their heads will rest against the plate E' when the same is used. A washer $d$ is then placed on the slotted end of each of the bolts and the key D inserted in said slot, the ends of which key may be divided, as shown in Fig. 1 of the drawings, thus preventing its accidental removal. By using the tool shown in Fig. 7 of the drawings it is evident that the spring, which comprises in some instances the plate E as well as the plate E', may be sprung sufficiently to allow of the easy insertion of the key, or the key being slightly tapered may be driven through the slot or otherwise forced therethrough. It is obvious that by using the spring compensation for the expansion and contraction of the bolts will be afforded and that as the spring-plate E is provided with projections, so as to hold it at a distance from the fish-plate, crystallization thereof will be prevented. It is also apparent that by using the plate E' in addition to the spring-plate E the last-named plate may be made of thinner metal and that the plate E' will also act as a spring or form a portion thereof.

While I have shown in Fig. 4 of the drawings the plate E' as being supported by means of the projections $e'$ on the plate E and at a distance from the last-named plate, yet I may omit the projections on the outer surface of the plate E, so as to allow the plate E' to lie flat thereagainst, or in some instances I may omit the plate E' or outer plate, in which case it is evident that the projections $e'$ will not be required.

In Fig. 10 of the drawings I have shown a modified form of the securing-key which I may sometimes use, which consists of splitting the key longitudinally, so that one portion may be bent after it is inserted in the slot of the bolt.

Having thus fully described my invention, what I claim as new, and desire to secure by Letters Patent, is—

1. In a spring-fastener for bolts, the combination of the pieces to be secured together provided with openings, a metal spring-plate extending from one bolt to the other and provided with openings and having projections and located on the outer surface of one of said pieces, another plate extending from one bolt to the other and provided with openings and located on the outer surface of the said spring-plate, bolts passing through the openings of said plates and the pieces to be secured together and having near one of their ends a slot, and a key located in said slot, substantially as described.

2. In a spring-fastener for bolts, the combination with the pieces to be secured together provided with openings, of a spring-plate provided with projections on each of its sides and having openings and located on one of the said pieces, another plate provided with openings and located on the outer projections of the spring-plate, bolts passing through openings in said plate and the pieces to be secured together and having near one of their ends a slot, and a key located in said slot, substantially as described.

SAMUEL C. BALL.

Witnesses:
ERNEST BIHLO,
C. E. DAVIS.